Feb. 24, 1925.                                               1,527,355
S. S. GENTILE
ATTACHMENT FOR INTERNAL COMBUSTION ENGINES
Filed June 21, 1922

Inventor
S. S. Gentile
By Gross & Collings
Attorneys

Patented Feb. 24, 1925.

1,527,355

UNITED STATES PATENT OFFICE.

SCIPIO S. GENTILE, OF VICKSBURG, MISSISSIPPI.

ATTACHMENT FOR INTERNAL-COMBUSTION ENGINES.

Application filed June 21, 1922. Serial No. 569,933.

*To all whom it may concern:*

Be it known that I, SCIPIO S. GENTILE, a citizen of the United States, residing at Vicksburg, in the county of Warren and State of Mississippi, have invented certain new and useful Improvements in an Attachment for Internal-Combustion Engines, of which the following is a specification.

This invention relates to a fuel intercepting attachment for internal combustion engines and has for its particular object to provide means for intimately mixing the air and fuel together with the interception or trapping of unvaporized fuel prior to admission into the combustion chamber of the engine and the removal of the unvaporized fuel.

Heretofore it has been the practice to provide fan shaped propellers in the path of the fuel, the purpose of these propellers being that of facilitating the intermingling of the particles of fuel and air. However, these known structures have not functioned efficiently because in practical operation these propellers did not cause a sufficiently intimate mixing nor complete interception of the air and fuel.

If a column of air is caused to flow through a conduit, or the like, in which there is disposed one or more fan like propellers capable of easy rotation, the column of air is only slightly disturbed by striking against the fan or propeller blades. The column of air travels in nearly a straight path, that is, with very slight whirling tendency. The fan will naturally rotate taking its power from the travel of the column of air but the air current remains nearly straight and undisturbed.

Therefore, in order to provide efficient means for causing a complete mixing and intermingling of the fuel and air, means must be provided for hindering the air with its suspended fuel from flowing in an undisturbed straight line thus insuring a more efficient mixing of the fuel and the air.

This object is accomplished in my present invention wherein there is provided a pair of propellers having each a plurality of Y-shaped blades so arranged relatively to one another that the direction of motion of the column of fuel and air is suddenly and repeatedly changed and a more efficient mixture is thus obtained.

There is still a further and important object of this invention. No matter how thoroughly some portion of the liquid fuel may be vaporized and mixed with air before combustion begins, if there is any unvaporized fuel present the combustion of the unvaporized fuel will not be as rapid as that of the vaporized fuel. This will result in either projecting unburned fuel into the exhaust of the engine or in a delayed combustion which is less effective in producing power. This lack of combustion or delayed combustion allows inefficiency together with the attendant evils of carbon in the cylinder, overheating, smoking, and mixing unvaporized fuel with the oil in the crank case. It is therefore of paramount importance that unvaporized fuel be trapped and removed before it reaches the combustion chamber. While there are devices designed to mix liquid fuel and air there is none which will really trap the fuel and remove the fuel so trapped, so with these known devices it is only a question of time when the trapped liquid will be again driven forward with the air and vapor and the device fails in its object.

Therefore, in order to provide an effective means of preventing the admission of liquid fuel into the combustion chamber of the engine means must be provided not only to abruptly change the direction of motion of the fuel and air, thus separating the liquid fuel from the air and vapor because of the great difference in specific gravity, but to remove this unvaporized liquid before it has collected in sufficient quantity to be again carried forward by the moving column of air and vapor.

This object is accomplished by my present invention by causing the column of fuel and air to travel in a tortuous path, thus trapping the liquid fuel on the Y-shaped blades and the transfer from these blades by centrifugal action, due to the rotation of the blades, to the surrounding jacket and removal from the jacket through a pipe.

The invention furthermore consists in the novel combination, construction and arrangement of parts more fully hereinafter described and illustrated in the accompanying specifications and drawing.

In the drawings, Fig. 1 is a side elevation of the invention partly in section,

Figure 1:
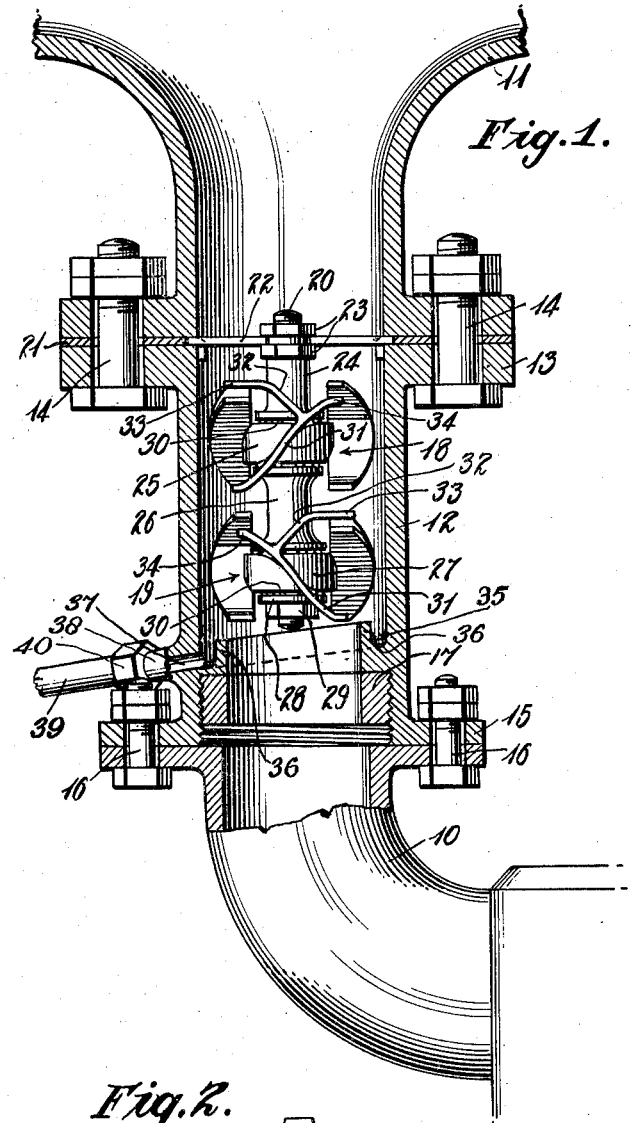
Figure 3:
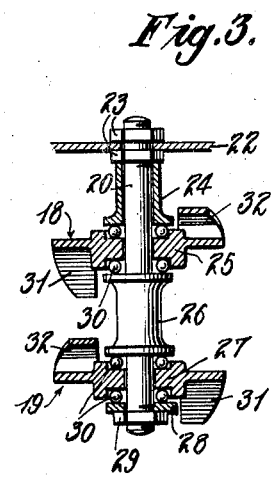
Fig. 3 is a longitudinal sectional view.

Referring now more particularly to the drawings wherein like reference characters indicate like parts, it will be seen that there is illustrated a pipe 10 connected preferably to a carburetor and there is also illustrated a portion 11 of the intake manifold of internal combustion engine. My improved invention is adapted to be interposed between the intake manifold and the carburetor and for this purpose there is provided a jacket 12 formed with a flange 13 at the upper end thereof, whereby connection may be made by bolts 14 with the intake manifold.

The lower end of the jacket 12 has secured thereto a collar 15 by means of which connection is made by bolts 16 with the pipes from the carburetor. An externally threaded collar like plug 17 is screw-threaded into the lower end of the jacket 12.

Suspended intermediate the jacket 12 is the intercepting device. This device comprises two fan members 18 and 19 journalled on a shaft 20 suspended from a frame 21. The periphery of the frame 21 is adapted to be clamped between the adjacent edges of the jacket 12 and intake manifold 11. The frame 21 is in the form of a supporting spider with the central portion thereof cut away with the exception of a transverse member 22 to which the shaft 20 is attached by means of a pair of clamping nuts 23.

Mounted upon the shaft 20 in the order named is a flanged sleeve 24, a hub 25 for the upper fan blades, an enlargement 26 flanged at both ends and preferably formed integrally with the shaft, a hub member 27 for the blades of the lower fan, a washer 28 and a nut 29. Raceways are formed on the upper and lower faces of each of the hub members 25 and 27 for the accommodation of ball bearings 30 whereby the propellers or fans may rotate freely. These ball bearings are preferably made of bronze instead of steel so that they will not be subject to rust or corrosion. Obviously by removing the nuts 23 and 29 the entire structure may be disassembled for the purpose of replacing such parts as may become worn or broken.

Each fan consists of a plurality of blades, the blades of each fan being arranged in an opposite direction so that the column of air and fuel passing through the jacket 12 will cause them to revolve in opposite directions. Each blade is substantially Y-shaped and consists of a main portion 31 inclined at an angle relative to a line drawn at right angles to the axis of the shaft 20 and an added or forward wing portion 32, preferably welded to the main leaf of the blade.

Figure 4:
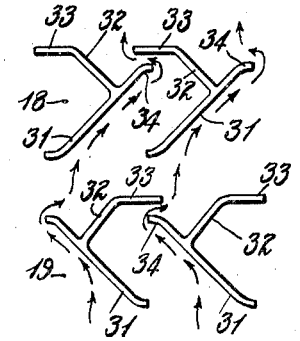
Fig. 4 is a diagrammatic view illustrating the propeller and intercepter arrangement.
Figure 2:
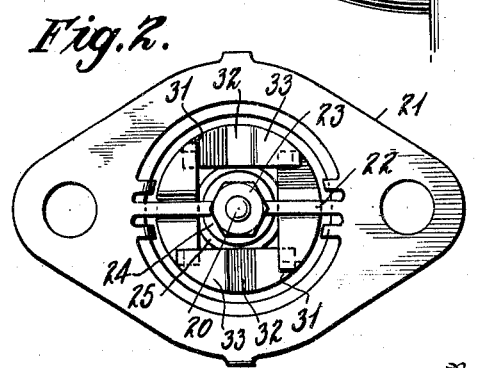
Fig. 2 is a top plan view of the device detached.

By referring more particularly to Fig. 4 it will be seen that the blades of the upper fan 18 have their main leaf portion 31 inclining upwardly and toward the right, while the added or forward leaf 32 extends at approximately a similar angle in the opposite direction. The forward leaf is provided with a horizontal portion 33 which overlies the upper end 34 of the next adjacent main leaf 31. The blades of the lower fan 19 have their main leaves 31 inclining upwardly and in the opposite direction, the forward leaves or blades 32 projecting from the main leaves at approximately the same angle and in the opposite direction. As in the upper fan, the horizontal portions 33 overlie the upper end 34 of the next adjacent main leaf.

The air and fuel is therefore caused to travel in a path similar to that indicated by the arrows, the liquid fuel being trapped by the overlapping of the Y-shaped blades. This changing of the direction of motion of the air and fuel causes them to more intimately intermingle especially in view of the fact that the passage of the liquid has been abruptly checked or stopped by striking the various leaves of the propeller blades interposed in its path. Any particle of fuel which is not thoroughly broken up and caused to mix with the air is caught by the upper fan and removed before it reaches the intake manifold.

The passage of air through the jacket 12 will cause the fans to rotate in opposite directions but the rotation of the fans will not permit the column of air to pass therethrough uninterrupted. This is particularly assured by reason of the complete overlapping of the several blades of each fan.

The overlapping or intercepting blades of the propellers intercept or trap particles of liquid and, because of their rotation, throw this liquid against the wall of the jacket 12. For the purpose of collecting this intercepted fluid I provide adjacent to the lower end of the jacket 12 a circumferential trough 35, formed preferably integrally with the jacket 12 by casting thereon an upturned lip 36. However, this annular trough or way may be formed in any suitable manner. Adjacent to the lower side thereof there is provided an opening 37 formed with a nipple 38, to which a pipe 39 may be connected by means of a coupling nut 40, or the like, whereby the fuel collected in the trough may be conveyed to an auxiliary tank or back to the ordinary fuel tank provided on motor vehicles or otherwise conveyed to the carburetor. In this way the unvaporized fuel which is intercepted and thrown to the sidewalls of the jacket 12 will be collected, removed from contact with the column of air and fuel en route to the engine, and finally utilized so as to make the device very economical as regards fuel consumption.

In practice it has been found that an intercepter constructed in accordance with this invention operates with a very high degree of efficiency and that this efficiency is not impaired by adjusting the carburetor or by the carburetor being out of adjustment so that a lean mixture is obtained. Leaner mixtures can be used without sacrificing efficiency or power, with the use of this improved mixer than with other known devices, because of the thorough mixing of the air and fuel accomplished and the consequential utilization of every particle of fuel. Likewise the fuel receiving trough catches and assists in preserving the unvaporized fuel intercepted by the blades.

While I have illustrated the fan blades as of one particular design, it is obvious that the same result may be obtained with a slightly varying design, it being important only that a portion of each blade overlie a portion of the next adjacent blade so as to provide a continuous barrier to the column of air and fuel.

In like manner the specific mounting of the fan blades and other details of construction may be varied without departing from the spirit and scope of this invention and to this end I reserve the right to make such changes and modifications in the structure illustrated and described as may come within the purview of the accompanying claims.

Having thus described the invention what is claimed is:

1. In an intercepter of the class described a fan member provided with a plurality of blades, each blade having an outstanding wing overlying one end of the next adjacent blade in spaced relation in a plane paralleling the axis of the fan member.

2. In an intercepter of the class described a jacket, a fan member mounted within said jacket, said fan comprising a plurality of angular blades, each blade having one angular end and an angular wing which overlies the angular end of the next adjacent blade in spaced relation in a plane paralleling the axis of the fan member.

3. A fuel intercepter comprising a jacket adapted to be interposed between the carburetor and the intake manifold of an engine, an intercepting fan disposed in said jacket, said fan being provided with a plurality of angularly disposed blades, each blade having an inclined body portion and being provided with a wing projecting therefrom intermediate its ends and inclined and overlying a portion of the inclined body of the next adjacent blade.

4. A fuel intercepter comprising a jacket adapted to be interposed between the carburetor and the intake manifold of an engine, a plurality of intercepting blades disposed in said jacket, each of said fans being provided with a plurality of angularly disposed vanes, each vane being provided with an oppositely angular wing projecting therefrom intermediate its ends and overlying one end of the next adjacent vane.

5. A fuel trapping device adapted to be interposed between a carburetor and intake manifold said trapping device comprising a jacket formed with a circumferential trough adjacent its lower end, a supporting frame, a pair of propellers supported by said frame and suspended within said jacket, each propeller being provided with a plurality of trapping blades, each blade comprising an inclined main portion and a wing portion extending therefrom and angularly disposed relative thereto, said wing portion overlying the main portion of the next adjacent blade, the trapped fuel being collected by said trough and a pipe connected thereto for conveying trapped fuel to a point beyond the jacket.

In testimony whereof I affix my signature.

SCIPIO S. GENTILE.